United States Patent
Stelmar Netto et al.

(10) Patent No.: US 10,979,298 B2
(45) Date of Patent: Apr. 13, 2021

(54) COLLABORATION NETWORK AND SERVER

(71) Applicant: INTERNATIONAL BUSINESS MACHINES CORPORATION, Armonk, NY (US)

(72) Inventors: Marco Aurelio Stelmar Netto, São Paulo (BR); Carlos Demetrio De Souza, São Paulo (BR); Marcelo Dos Santos Rodrigues, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/199,010

(22) Filed: Nov. 23, 2018

(65) Prior Publication Data

US 2020/0169465 A1    May 28, 2020

(51) Int. Cl.
*H04L 12/24* (2006.01)
*H04L 29/08* (2006.01)

(52) U.S. Cl.
CPC .............. *H04L 41/12* (2013.01); *H04L 67/10* (2013.01)

(58) Field of Classification Search
CPC ....... H04L 41/12; H04L 67/10; G06Q 10/103; G06Q 10/101
See application file for complete search history.

(56) References Cited

U.S. PATENT DOCUMENTS

| 8,370,192 B2 | 2/2013 | Deo et al. |
| 9,875,510 B1 | 1/2018 | Kasper |
| 9,953,281 B2 | 4/2018 | Wiig et al. |

(Continued)

FOREIGN PATENT DOCUMENTS

| WO | 2017136643 A1 | 8/2017 |
| WO | 2017145005 A1 | 8/2017 |
| WO | 2017161417 A1 | 9/2017 |

OTHER PUBLICATIONS

"Could Blockchain Technology Improve Project Success," [online] Smart Projex Inc. © 2012-2017, Jan. 8, 2018, retrieved from the Internet: <www.smartprojex.com/could-blockchain-technology-improve-project-success/>, 5 pg.

(Continued)

*Primary Examiner* — Caroline H Jahnige
(74) *Attorney, Agent, or Firm* — Cuenot, Forsythe & Kim, LLC

(57) ABSTRACT

A multi-node collaboration network can include multiple computing nodes communicatively coupled to a collaboration server. A computing node can be joined to the multi-node collaboration network for sharing data corresponding to a current project among a set of project team members. Current project data can be compared, using computer hardware, with previous project data stored in a data storage device communicatively coupled to the collaboration network. A previous project corresponding to the current project can be determined, using the computer hardware, based on the comparing the current project data with the previous project data. Using the computer hardware and responsive to detecting a nonconforming decision, an electronic notification of the nonconforming decision is provided.

17 Claims, 10 Drawing Sheets

(56) References Cited

U.S. PATENT DOCUMENTS

| | | | |
|---|---|---|---|
| 9,965,628 B2 | 5/2018 | Ford et al. | |
| 2005/0114829 A1 | 5/2005 | Robin et al. | |
| 2011/0119193 A1 | 5/2011 | McLees et al. | |
| 2012/0265559 A1 | 10/2012 | Colagiovanni, Jr. | |
| 2013/0212583 A1* | 8/2013 | Gordon | G06F 9/44 718/100 |
| 2013/0254737 A1 | 9/2013 | Lal | |
| 2014/0137071 A1* | 5/2014 | Wadhwani | G06F 8/20 717/101 |
| 2014/0237614 A1 | 8/2014 | Irvine | |
| 2015/0066563 A1 | 3/2015 | McLees et al. | |
| 2015/0227890 A1 | 8/2015 | Bednarek et al. | |
| 2015/0228004 A1 | 8/2015 | Bednarek et al. | |
| 2016/0027229 A1 | 1/2016 | Spanos et al. | |
| 2016/0217436 A1 | 7/2016 | Brama | |
| 2017/0046651 A1 | 2/2017 | Lin et al. | |
| 2017/0046689 A1 | 2/2017 | Lohe et al. | |
| 2017/0085555 A1 | 3/2017 | Bisikalo et al. | |
| 2017/0109735 A1 | 4/2017 | Sheng et al. | |
| 2017/0180372 A1* | 6/2017 | Bezold | G06F 21/6209 |
| 2017/0206532 A1 | 7/2017 | Choi | |
| 2017/0220815 A1 | 8/2017 | Ansari et al. | |
| 2018/0005186 A1 | 1/2018 | Hunn | |
| 2018/0082043 A1 | 3/2018 | Witchey et al. | |
| 2018/0089256 A1 | 3/2018 | Wright, Sr. | |
| 2018/0114169 A1 | 4/2018 | Wiig et al. | |
| 2018/0130050 A1 | 5/2018 | Taylor et al. | |
| 2019/0109702 A1* | 4/2019 | Maggu | G06Q 20/4016 |
| 2019/0258971 A1* | 8/2019 | Winarski | G06F 11/0709 |
| 2020/0133658 A1* | 4/2020 | Agrawal | G06F 8/70 |

OTHER PUBLICATIONS

Pastor, I.G., et al., "Unveiling the Opportunities of Using Blockchain in Project Management," In Proc. of the 1st Int'l. Conf. on Research and Education in Project Management, Feb. 22-23, 2018, 4 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

COLLABORATION NETWORK AND SERVER

BACKGROUND OF THE INVENTION

The present disclosure relates to computer networking, and more particularly, to a collaboration network and server.

Completing a complex project of virtually any kind frequently involves multiple professionals working through multiple phases. A computer network can facilitate collaboration among a team of professionals by enabling the members to exchange ideas and make decisions without each being present at the same time at the identical location. The convenience and efficiency gained by allowing team members to exchange ideas and make decisions over such a network can enhance the team's creativity and productivity.

SUMMARY

A method includes joining, using computer hardware, a computing node to a multi-node collaboration network for sharing data corresponding to a current project among a set of project team members, comparing, using the computer hardware, current project data with previous project data stored in a data storage device communicatively coupled to the collaboration network, determining, using the computer hardware, a previous project corresponding to the current project based on the comparing the current project data with the previous project data, and providing, using the computer hardware and responsive to detecting a nonconforming decision, an electronic notification of the nonconforming decision.

A system includes a collaboration server having at least one processor programmed to initiate executable operations. The executable operations include joining a computing node to a multi-node collaboration network for sharing data corresponding to a current project among a set of project team members, comparing current project data with previous project data stored in a data storage device communicatively coupled to the collaboration network, determining a previous project corresponding to the current project based on the comparing the current project data with the previous project data, and providing, responsive to detecting a nonconforming decision, a notification of the nonconforming decision.

A computer program product includes a computer-readable storage medium having program code stored thereon. The program code is executable by computer hardware to initiate operations. The operations include joining a computing node to a multi-node collaboration network for sharing data corresponding to a current project among a set of project team members, comparing current project data with previous project data stored in a data storage device communicatively coupled to the collaboration network, determining a previous project corresponding to the current project based on the comparing the current project data with the previous project data, and providing, responsive to detecting a nonconforming decision, a notification of the nonconforming decision.

DETAILED DESCRIPTION

Figure 1:
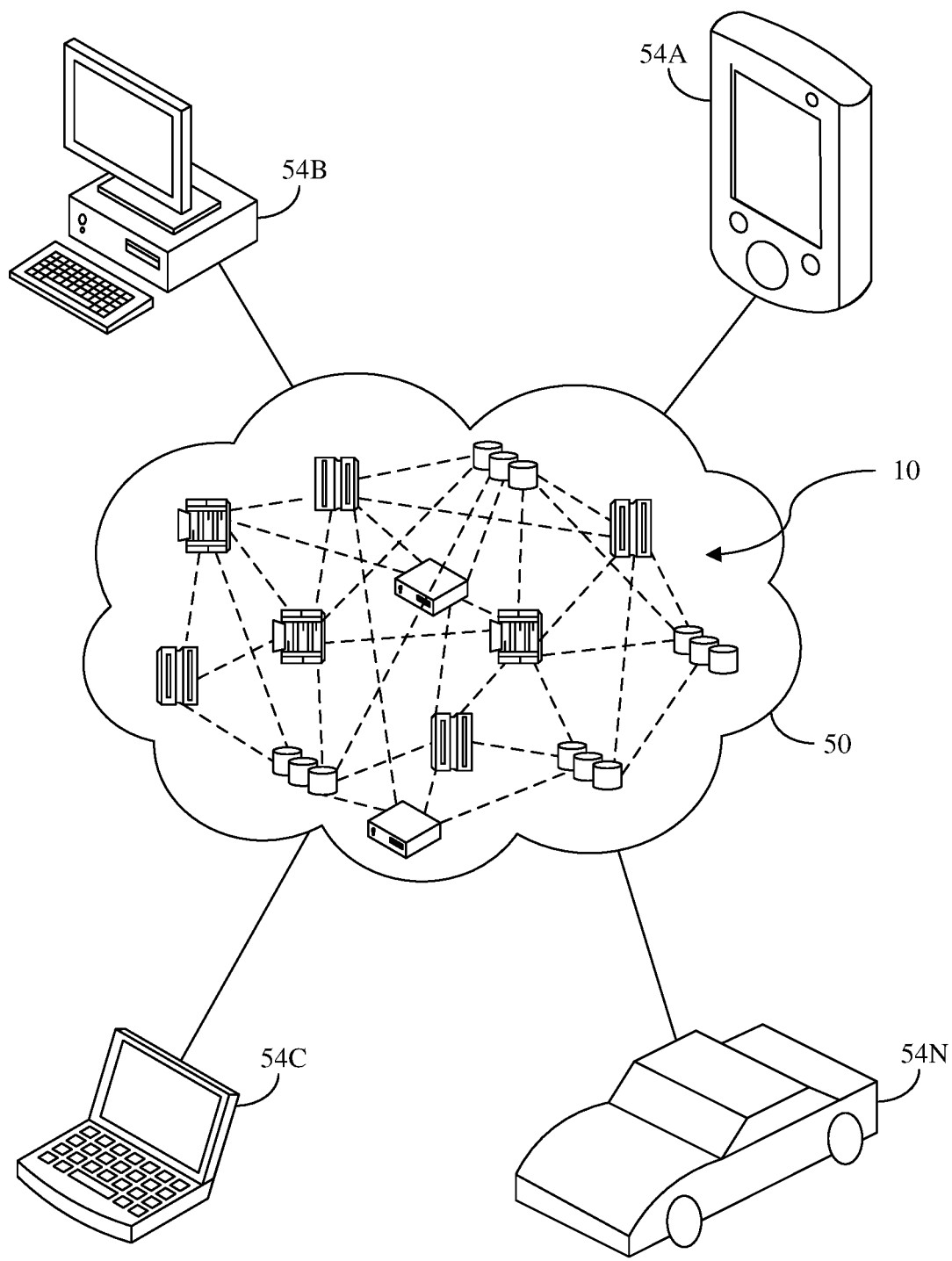
FIG. 1 depicts a cloud computing environment according to an embodiment of the present invention.

The present disclosure relates to a computer-based collaboration network and collaboration server.

Many projects—regardless of the technology involved and whether undertaken by a business, governmental, or other organization—often require that many different professionals with different types of expertise work collaboratively through multiple phases to bring the project to fruition. A project can begin with formulation of a set of requirements that must be satisfied. Decisions must be made as to how best to meet the project requirements. Once design decisions are made, project implementation must be monitored to ensure that the project evolves as intended.

Enabling team members to collaborate on a project through a computer network can enhance the team's creativity and productivity. There is, however, an additional need to guide, track and audit project decision making and implementation. The present disclosure describes various embodiments of a system comprising a collaboration network and server for collaborative decision making and project implementation. The system leverages data pertaining to past projects to generate a corpus of training data that the system uses to construct a classifier model, based on machine learning, to categorize the past projects. In response to system input specifying features of a current project, the system uses the model to classify the current project and thus identify similarly classified past projects. The system additionally couples machine learning (e.g., natural language processing and image processing) with various types of sensors that are used to identify conforming and non-conforming project implementation decisions. (As used throughout this disclosure, a non-conforming decision is one that deviates from an earlier team-endorsed decision or one that deviates from a similar decision on a past project identified by the system as similar to the current project.)

In one embodiment, the system utilizes a collaboration network comprising multiple computing nodes over which team members working on a project can share project data. The system can leverage lessons learned on past projects by comparing the shared project data with data stored in the memory of the collaboration server, which is communicatively linked to the computing nodes. The data can be collected over time from multiple projects on an on-going basis. A project-specific collaboration network can be created on an ad hoc, project-by-project basis for each individual project. Through the collaboration network, stored data on past projects can be utilized with the current project by accessing the collaboration server.

Data pertaining to completed projects can be shared on the collaboration network and analyzed by the system to determine which decisions led to successful outcomes and which did not, success being defined according to predefined criteria supplied to the system. Predefined criteria encompass objective measures such as whether a project was completed within a specified time, whether the project was completed without cost overruns, and/or whether the completed project performs according to specification (e.g., meets specified performance metrics). As described below, the system analyzes outcomes in the context of corresponding decision data stored on a collaboration server in order to systematically identify decisions that meet or exceed such specified measures and those decisions that do not. The system updates the database by incorporating the analysis of outcomes and modifying criteria based on newly analyzed data.

Based on data comparisons made by the system, a set of project requirements can be automatically generated by the system. Past project requirements identical or sufficiently similar to project requirements for a current project serve as a guide. In particular, the system analyzes stored decision data with respect to a same or similar past project to identify past decisions that the system classifies as major decisions in that the decisions proved to have more than a trivial effect on the outcome of the past project. That is, the system identifies as major any decision that affects the project's criteria of success (e.g., whether the project was completed within a specified time, whether the project was completed without cost overruns, or whether the completed project conformed to specification).

As the current project proceeds, the system can identify decisions relating to aspects encountered on past, similar projects and generate a notification if a decision does not conform to one previously made. The notification request, e.g., an electronic message such as a text message, electronic mail message, etc., can be conveyed by the system to the team member responsible for the decision, instructing that data be input into the system to explain and justify the deviation. The input can be stored in the memory on the collaboration server and analyzed by the system to determine whether the decision improved or degraded the current project in some way. The analyzed data can be used as a further guide in subsequent projects. Accordingly, the memory-stored data from analyzed projects provides a corpus of project data that increases in size with each successive project. The system can use machine learning (e.g., linear discriminant analysis, naive Bayes classification, support vector machines) to construct and refine a model for classifying projects and identifying decisions based on the continually expanding corpus of project data.

Additionally, the system can include one or more sensing devices communicatively coupled to one or more computing nodes. A sensing device can monitor project decisions and implementation tasks, identifying in particular those that deviate from a directive or past practice related to an identical or similar prior project. Deviations can be analyzed by the system to determine whether the identified deviations improved or impaired the current project.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
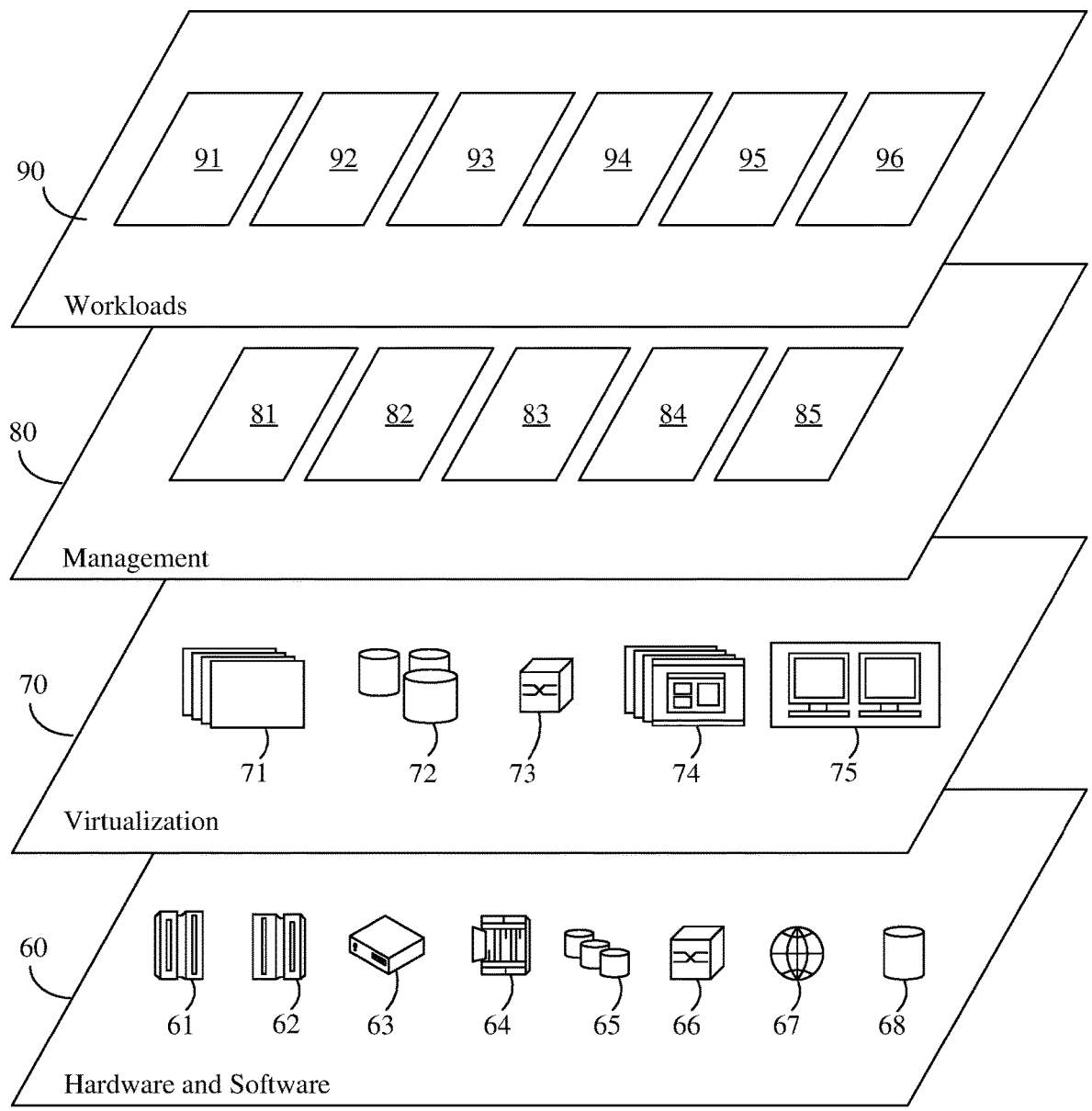
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and project collaboration system (system) 96.

In one or more embodiments, system 96 can comprise a collaboration network of multiple computing nodes over which project team members can exchange project data. System 96 can compare current project data to prior project data stored in the memory of a collaboration server communicatively coupled to the collaboration network. Based on the comparison, a determination can be made by system 96 as to whether the current project is identical or similar to a previous project. As described more fully herein, data from an identical or similar project can be used by the system to leverage lessons learned on past projects to guide current project decisions and implementation.

System 96 can detect two types of deviations, or nonconforming decisions. First, once current design decisions are made, deviations in implementing the project can be detected by the system. For example, if the project involves the manufacture of a custom-designed product and a decision is made to use certain materials, a subsequent change in materials used constitutes a nonconforming decision. Likewise, with respect to an IT delivery project, for example, if a change is made regarding a designated system or section of code, and a subsequent decision is made to use a different system or different code, the decision is deemed a nonconforming decision.

A second type of deviation, or nonconforming decision, is in connection with one or more prior projects that the system identifies as identical or sufficiently similar to the current project. The system can use machine learning (e.g., linear discriminant analysis, naive Bayes classification, support vector machines) to build a classification model that can identify different types of projects based on designated sets of features. If a prior project identified as identical or sufficiently similar to the current project involved a related item or task, then a decision to use a different item (e.g., manufactured part, software module) or perform a task (e.g., parts assembly) differently constitutes a nonconforming decision. Thus, as used herein, a "nonconforming decision"

is any decision that deviates from one earlier agreed to with respect to the current project or one identified as having been taken in a prior project.

The system also uses one or more sensing devices, which generate data used in monitoring the implementation of the project. The sensor-generated data can be analyzed using machine-learning techniques, including image processing and/or natural language processing. A non-conforming decision made during project implementation can be detected using the one or more sensing devices. The detection initiates a series of system responses, described in detail below, that reduce the risk that such a deviation will be deleterious to project implementation.

It should be noted that system 96 does not treat a nonconforming decision as inherently harmful. Rather, the system takes such decisions into account and analyses the results such decisions produce. If a nonconforming decision improves the project, the improvement is recorded as part of the body of stored data accumulated from multiple projects. If a nonconforming decision impairs the project, that result, too, becomes part of the body of accumulated knowledge that guides future projects. System 96, including the computing nodes and collaboration server accessible via a collaboration network, can be implemented in various computing environments using various devices, as described more fully below. The system can, for example, be implemented in a blockchain. The system can, for example, be implemented in a cloud-based or other computing environment.

Figure 3:
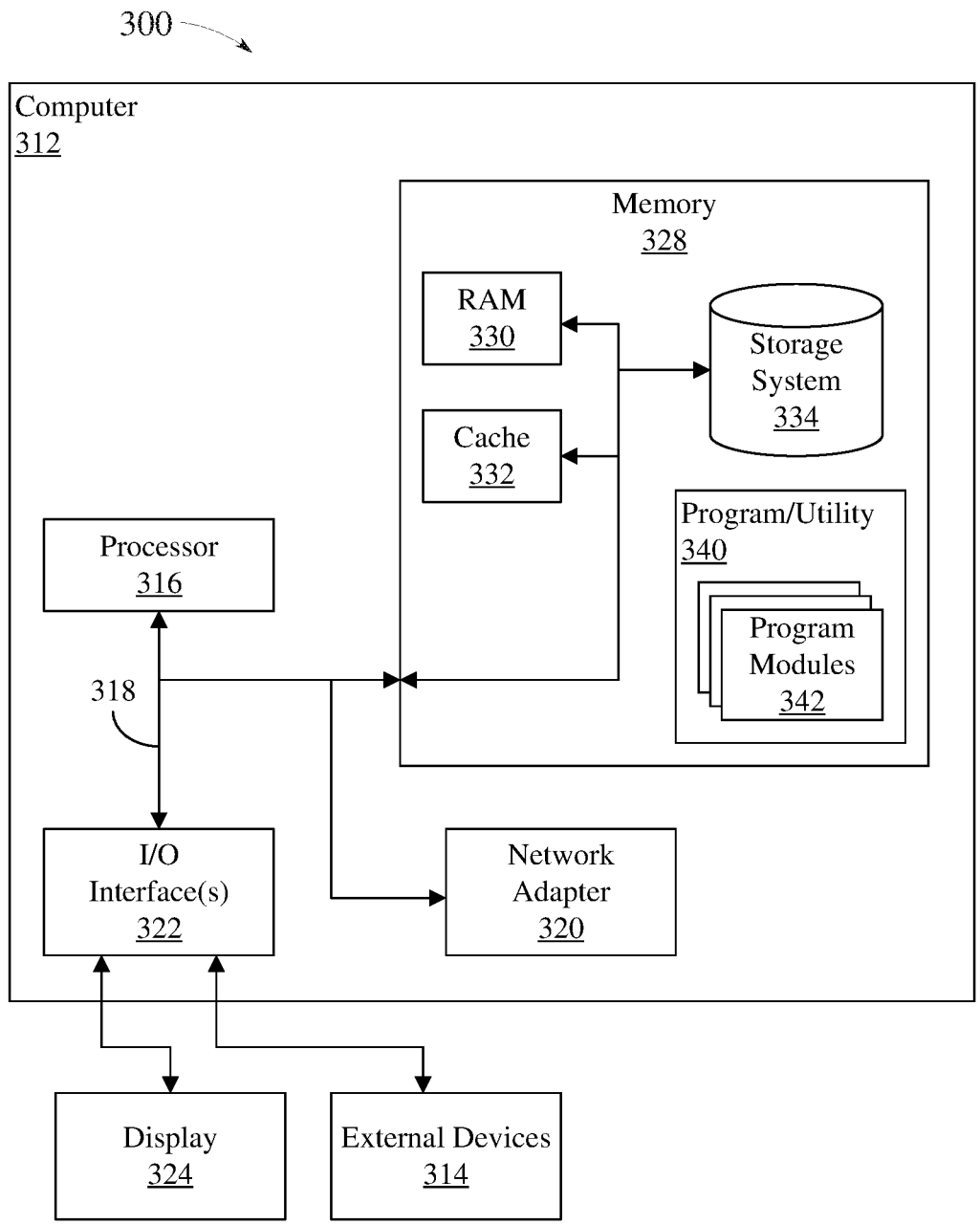
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, handheld or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in cloud computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and a PCI express (PCIe) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include system 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
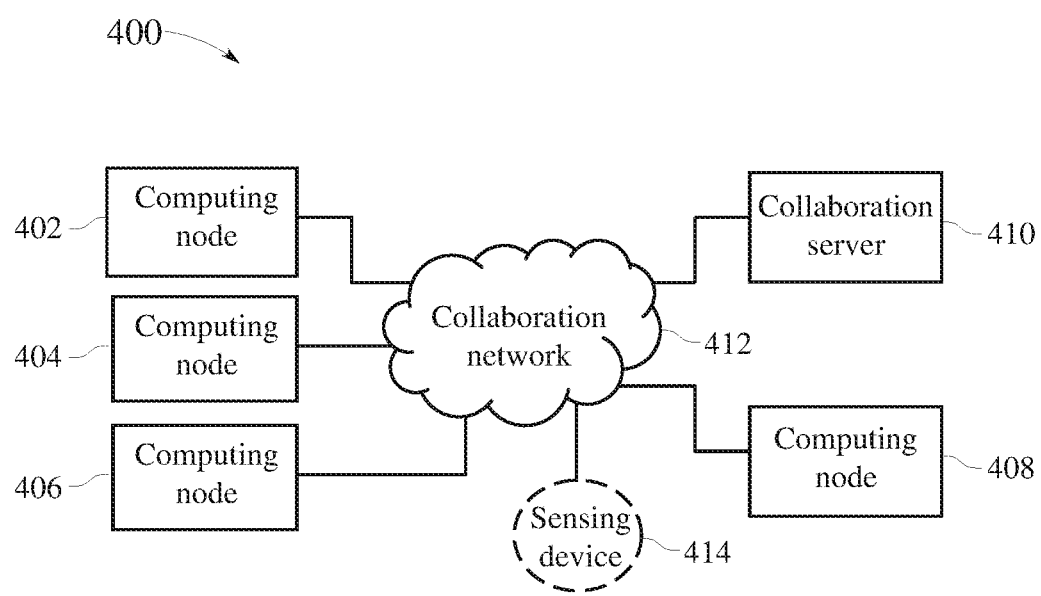
FIG. 4 depicts a computing environment in which a project collaboration system is implemented according to an embodiment of the present invention.

FIG. 4 depicts a computing environment 400 in which a consensus-based project collaboration system 96 is implemented according to one embodiment of the present invention. Computing environment 400 includes computing nodes 402, 404, 406, 408, and collaboration server 410. In one or more embodiments, the collaboration server 410 is an implementation of system 96. While shown to include four computing nodes, it should be appreciated that computing environment 400 may include fewer or more computing nodes. The computing nodes 402-408 and the collaboration server 410 are communicatively coupled via collaboration network 412.

The collaboration server 410, being implemented as described in connection with FIGS. 1-3, can include a memory for storing project data. The project data may include project data derived from prior projects that is utilized by the collaboration server 410 in the context of a current project. Alternatively, or additionally, a memory comprising project data can reside on one or more of the computing nodes 402-408.

Computing nodes 402-408 can be implemented as any type of computing device. For example, one or more of computing nodes 402-408 may be implemented as described in connection with FIG. 3. Examples of computing nodes 402-408 may include, but are not limited to, a personal computer, a server, a thin or thick client, a hand-held or laptop device, a multiprocessor system, microprocessor-based system, programmable consumer electronic device, a mobile device, network PC, minicomputer, mainframe computer, or similar such device.

Collaboration network 412 can be implemented in a LAN, WAN, over the Internet, as a public network, a private network or a virtual private network. More generally, computing environment 400 can be any type of computing environment, including a cloud-based computing environment.

Optionally, system 96 also can include one or more sensing devices 414. Sensing device 414 can be, for example, a camera for capturing visual images and/or video related to the implementation of certain aspects of a project. The camera can be a mobile device (e.g., device-embedded camera) or a stationary device that is strategically placed to capture and convey project-related images. The camera, in one embodiment, can be a smart camera or other imaging device capable of performing image analysis. Image analysis may include optical character recognition, object detection, facial detection, detection of human beings, etc. In particular embodiments, sensing devices 414 are capable of using machine learning (e.g., visual deep learning) for recognizing project-related images. In another embodiment, camera-captured images and/or video are conveyed from the camera to collaboration server 410, which is capable of performing the image processing and/or visual deep learning for recognizing and analyzing project-related images. In one or more other embodiments, the image processing described may be distributed across different computing nodes such that one or more of computing nodes 402-408 is capable of performing the image processing described.

Additionally, or alternatively, sensing device 414 can have audio capabilities for capturing audio such as speech and/or other sounds related to project implementation. In a particular embodiment, the sensing device 414 includes speech-to-text and/or natural language processing (NLP) capabilities for processing voice data related to a current project. In another embodiment, audio captured by sensing device 414 can be conveyed to collaboration server 410, which is capable of converting speech contained in the audio to text and analyzing the text using NLP. In one or more other embodiments, the audio and/or text processing described may be distributed across different computing nodes such that one or more of computing nodes 402-408 is capable of performing the processing described.

NLP is a field of computer science, artificial intelligence and computational linguistics which implements computer processes to facilitate interactions between computer systems and human (natural) languages. NLP enables computers to derive computer-understandable meaning from natural language (e.g., text) input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, sentiment analysis, tone analysis, and quantification information, such as cardinality, iteration, and dependency.

The examples of sensing device 414 described herein are provided for purposes of illustration only. Indeed, any device for capturing different types of physical signals and converting the signals into a computer-usable data format, or one that conveys the signals to a separate device that converts the signals into a computer-usable data formant, can serve as a sensing device 414. Thus, the sensing device 414 can include a transmitter, or be communicatively linked to a transmitter, for conveying signal-borne data to a receiver communicatively linked to one or more of the computing nodes 402-408. Received data can be saved by collaboration server 410.

Figure 5:
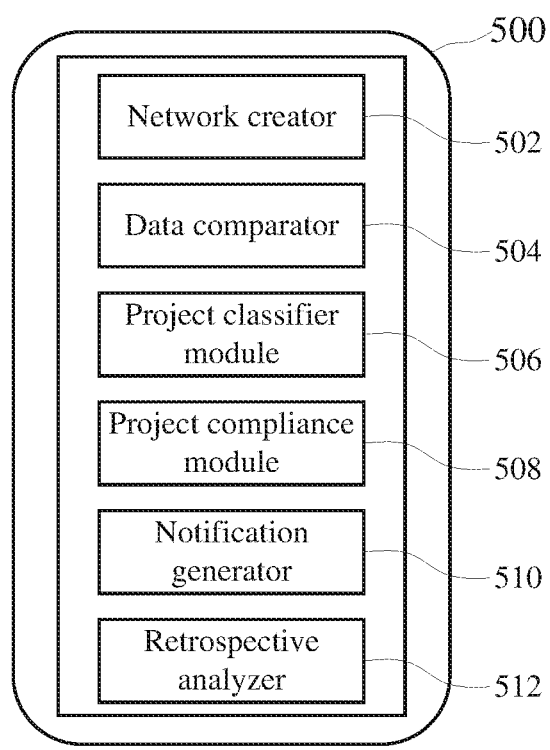
FIG. 5 depicts a collaboration tool for project collaboration according to an embodiment of the present invention.

In one or more embodiments, system 96 (e.g., collaboration server 410) also includes project collaboration tool 500, one embodiment of which is depicted in FIG. 5. Illustratively, collaboration tool 500 comprises network creator 502, data comparator 504, project classifier module 506, project compliance module 508, notification generator 510, and retrospective analyzer 512. Collaboration tool 500 can be implemented as a suite of software modules or processor-executable code. In one or more other embodiments, project collaboration tool may execute on one or more of computing nodes 402-408.

Operatively, network creator 502 can initiate team collaboration by establishing a format for sharing data among a selected group of nodes and broadcasting an invitation to each node to join collaboration network 412, thereby establishing data communication links between collaboration server 410 and computing nodes 402-408. Network creator 502 in creating the collaboration network can establish a protocol or procedure for accessing and inputting data to collaboration server 410. In a particular embodiment, network creator 502 can create a blockchain platform. Thus, the protocol or procedure created by network creator 502 can include a process for verification of data input and, in response to verification, addition of the data to the blockchain. Thus, data can be entered and stored in blocks, each successive block being linked by a cryptographic hash to a preceding block. The number of data blocks in the blockchain increases as the project develops. Network creator 502 governs additions of data to the blockchain and grants selected team members access to the blockchain, in accordance with this embodiment.

In response to the creation of the multi-node collaboration network by network creator 502, data comparator 504 can search the collaboration server 410 for data corresponding to identical or sufficiently similar projects undertaken in the past. Project classifier module 506 can utilize machine learning tools to classify past projects based on selected features. Data based on past projects provides a corpus of training data that is used by project classifier module 506 to construct a classifier model. In response to system input specifying features of a current project, the system uses the model to classify the current project and thus identify similar past projects as ones similarly classified. Features can vary depending on the nature and specific aspects of a particular project.

For example, an IT delivery project may include specific hardware or software architectural features, while a custom manufacturing process may include features related to specific structures or materials. In classifying a current project, features and attributes are identified and compared with features and attributes related to past projects. Based on the comparison, similarity between a current project and past projects can be determined by the classifier model constructed using machine learning. In a typical scenario, such a project can begin with a request for proposal (RFP). RFP data can be fed to the system by a team member using one of computing nodes 402-408. Alternatively, one or more computing nodes can be configured to receive the RFP directly over the Internet or via another network to which the node is communicatively linked. Additionally, documents such as specifications, computer code, and the like can be read in by sensing device 414. The data can be converted by the system into computer-readable data. Project classifier module 506 extracts from the input data all data that is relevant to the project based on a comparison of data from past projects determined to be similar. The current project having been categorized, project classifier module 506 additionally can identify decisions that must be made as the current project develops, specifically identifying those decisions that are the same or similar to decisions made in connection with one or more past projects. Based on past project data, classifier module 506 optionally can identify which decisions required with respect to the current project are major decisions. Specifically, project classifier module 506 can identify decisions that are equivalent to past project decisions that affected a project's outcome, such as a decision that affected whether a project was completed within a specified time, whether the project was completed without cost overruns, or whether when completed, yielded a performance that met required specifications. Any decision that affects the project's implementation time, cost of implementation, or profitability thus can be a major decision.

During the initial phase of any project some time and effort must be expended in gathering data and determining key requirements of the project. One benefit of the process of looking to past projects is the benefit of hindsight. This allows for the identification of potential issues that may arise but that would otherwise have been overlooked save for the fact that the issues were recognized by project classifier module 506 based on the data comparison effected with data comparator 504. In this respect, system 96 yields a better project in that the system autonomously injects an aspect into decision making by using data culled from past projects about which current team decision makers would otherwise not have known about or had access to. As such, system 96 facilitates improved quality of result in the implementation of the project. Functionally, the system reduces the risk of mistakes (e.g., cost overruns, implementation delays, and sub-performance of a completed project) by identifying potential problems in advance and without human supervision. Relatedly, the system on average improves project completion times because problems that would otherwise have slowed project completion until corrected are avoided altogether. This is the result of the system's advance identification of current potential problems based on the system's analysis of past projects that the system determines to be sufficiently similar to the current one.

If the project is one in which a team, such as an IT development or custom manufacturing team, is responding to an RFP, every requirement must be addressed. Failure to do so can disqualify the team. System 96 can use a machine-learning classifier model to identify one or more similar past projects. The system can extract data from similar past projects that involved similar RFPs. Based on past project data, the system can autonomously generate a response to the RFP. Team members can modify or simply adopt as their own the system-generated response. The system also can use the RFP requirements and past project data to identify specific decisions that must be made (e.g., decision requirements as to architecture, design, preferred materials, and the like). System 96 not only identifies decision requirements but identifies potential issues that without the benefit of hindsight might have led to costly mistakes in responding to the RFP by failing to recognize potential, but often overlooked issues. For example, in the context of an IT-delivery project, the RFP may request certain terms be included in a Service Level Agreement. The system can identify similar terms from data on a past project and determine based on the data that the terms led to unacceptable cost overruns. The system can thus generate an RFP response, subject to user override, that alters or omits the terms. Optionally, the system can also be trained using machine learning to pull data from external sources, such as published governmental regulations. Such data also can be stored on the collaboration server 412. If an RFP for the IT-delivery project, for example, specifies a type of data usage that recently enacted regulations prohibit, the system can generate a response proposal noting why this aspect of the project should be altered or omitted.

The system can also generate a set of objective criteria. The system can generate objective criteria by comparing data from the RFP, user data, and data from past projects to identify specific objectives pertaining to the project. For example, in the context of the IT-delivery project, the system can, based on the data, generate performance metrics that the project upon delivery must meet, such as processor speed. In the context of a different project, the performance metrics can be different. For example, with respect to a manufacturing project, a performance metric can be the stress tolerance of the materials used in manufacturing an item. More generally, an objective criterion can be cost of implementation. The system, for example, can extract data from past projects (e.g., amount of materials) and update the data with additional data pulled from network sources (e.g., current price of materials) to determine a cost amount that cannot be exceeded if the project is to be deemed a success.

At times during the progression of any project, decisions are made (perhaps especially with respect to technical ones) without adherence to certain procedures and without adequate documentation. Using system 96, team members can establish certain predefined decision-making procedures. System 96 assists in assuring team members comply with the procedures in making project decisions. The procedures can be stored in the memory of collaboration server 410. As decisions are made, the decisions can be documented and saved to the system. For example, in a blockchain implementation of system 96, the procedures, decisions, and corresponding documentation can be embedded in immutable data blocks and saved as part of the blockchain. Project compliance module 508 can help assure compliance with the procedures by detecting data entries that fail to comply with procedures. For example, the procedures may require that certain decisions be approved by a majority vote among certain team members. When a decision and documentation are recorded by the system, project compliance module 508 can identify whether the sufficient number of votes were obtained or not. Similarly, with respect to other specified procedures, project compliance module 508 can identify and record any nonconforming decision or deviation from the specified procedures. If system 96 is implemented in a blockchain, as described above, network creator 502 establishes specific procedures that govern adding data to the blockchain, as well as which selected team members have access to the blockchain.

Project compliance module 508 also can assist in assuring that the project is implemented in accordance with team-endorsed decisions. In one embodiment, project compliance module 508 analyzes data generated by sensing device 414 to monitor compliance. For example, in the context of a product manufacturing process, a team decision may call for using a specific type of part, a specific type of machinery, or a specific manufacturing technique. The module can be trained using machine learning (e.g., visual deep learning) to recognize images and, depending on the particular project, programmed to recognize specified parts, machinery, or activities and to compare the images to ones captured with sensing device 414. If sensing device 414 captures an image of a nonconforming part, machinery, or technique, project compliance module 508 can detect the deviation based on the supplied image. As discussed below, when such deviations are detected by sensing device 414, the system automatically generates notifications alerting appropriate team members of the deviation and initiates procedures for assessing the merits of making the deviation. The deviation may be warranted, indeed may be performance enhancing, but without automatic notification of the deviation, there is no opportunity for an informed decision to be made. Thus, again, the system reduces the risk of costly mistakes. The automatic notification generated by the sensing device alerts the team to a risk that would otherwise be undetected if an inferior input, process change, or other deviation made it more likely the project would fail to meet one or more performance metrics.

In another embodiment, the module can be trained to recognize images of design blueprints, drawings, computer code, or other specifications. System 96 can be implemented to require that any change to a design blueprint, drawing, computer code, or other specification be imaged, and the image conveyed to project compliance module 508, which identifies and records the deviation. For example, in an IT delivery project, if a specification indicates a section of code be used, the system can require that an image of the code utilized be supplied at a point during project implementation. If the code is nonconforming, project compliance module 508 can identify the deviation based on the corresponding image. This may be another change that improves project implementation, but it can, without effective oversight, raise the risk of mistakes. The system through automatic detection using the sensing device and system-initiated notification procedures reduces that risk. One additional benefit of providing enhanced monitoring, is that team members may be less reluctant to innovate if they know that any non-conforming decision will be backstopped by the system's procedural safeguards. These procedural aspects are described in detail below.

As an aspect of leveraging lessons learned from past projects, collaboration server 410 can also store images of various items from past projects, including video of procedures performed, images of parts or machinery used, design blueprints, spreadsheets, drawings, computer code, or other data. System 96, as described above, classifies or categorizes each new project and, based on the classification, identifies one or more identical or sufficiently similar past projects. During project implementation, in which procedures require recordation of documentation, images of current project items (e.g., parts, machinery, design blueprints, drawings, computer code, or other specifications), can be compared with images of corresponding items from past projects by project compliance module 508. Any nonconforming items can be identified and noted by the system. For example, if in connection with an IT delivery project, a particular operating system and/or database had been used successfully in an identical or similar project previously, then using a different operating system and/or database in the current project would be identified as nonconforming and a notification would be generated by notification generator 510. Data generated in connection with compliance monitoring is stored in collaboration server 410 and analyzed, as described below, to serve as a guide in subsequent projects.

Project compliance module 508 can further facilitate consensus-based decision making by documenting which team members are responsible for which aspects of the project and specifying which team members also must jointly approve decisions made regarding the project. As decisions are made, the decisions are recorded by system 96 in the collaboration server 410 (e.g., as part of a blockchain). Project compliance module 508 can automatically identify decisions that are made without proper authorization or that are contrary to specifications previously agreed to by designated team members. Notification generator 510 can generate a corresponding notification issued to team members through computing nodes 402-408 whenever a nonconforming decision is made.

In addition to facilitating consensus-based collaboration, system 96 also provides a retrospective analysis of the project when completed. System 96 augments the collaboration server 410 with the analysis, which subsequently serves as a guide for future projects. Specifically, retrospective analyzer 512 analyses each decision documented at each stage of the project, identifies both conforming and non-conforming decisions, and records those decisions deemed successful as well as those deemed not successful, according to predefined criteria. Predefined criteria encompass objective measures generated by the system based on past project data, user-supplied data, and optionally, a received RFP, as described above. Objective measures, as described above, can include whether a project was completed within a specified time, whether the project was completed without cost overruns, or whether the completed project performs according to specification. For example, in the context of the above-referenced example of changing a section of software code in implementing an IT project, if the changed code ran faster than the code it replaced in implementing a same or a similar past IT project, then based on an objective criterion (software execution time) the code-change decision would be deemed by the system to constitute a success.

System 96 analyzes outcomes in the context of corresponding decision data stored in a collaboration server memory in order to systematically identify decisions that met or exceeded such objective measures and those decisions that did not. The system updates collaboration server 410 by incorporating the analysis of outcomes and modifying criteria based on the newly analyzed data. The data is used to update and refine the classifier model used in identifying past projects sufficiently similar to a current project.

Any nonconforming decision that deviates in some way—for example, using a different element or performing a function differently—if deemed successful by retrospective analyzer 512, according to predefined criteria, can guide subsequent teams to adopt the same strategy in future projects. Conversely, if adhering to a past practice in connection with a present project produces a successful result, the result can reinforce the merits of continuing to follow the practice with future projects. Even those decisions, whether conforming or nonconforming, that prove less than successful become part of the memory of collaboration server 412 and serve a useful purpose since the decisions can be referenced by system 96 in guiding future projects.

Retrospective analyzer 512 also can generate data for tracking and auditing various aspects of a project, the data being also stored in the memory of collaboration server 410 for future project guidance. A retrospective analysis can assess whether all project deliverables were met, resources expended (both man-hours and materials), and at what cost. By matching costs to corresponding project deliverables, retrospective analyzer 512 can provide an assessment of a project's financial feasibility in the future.

Figure 6:
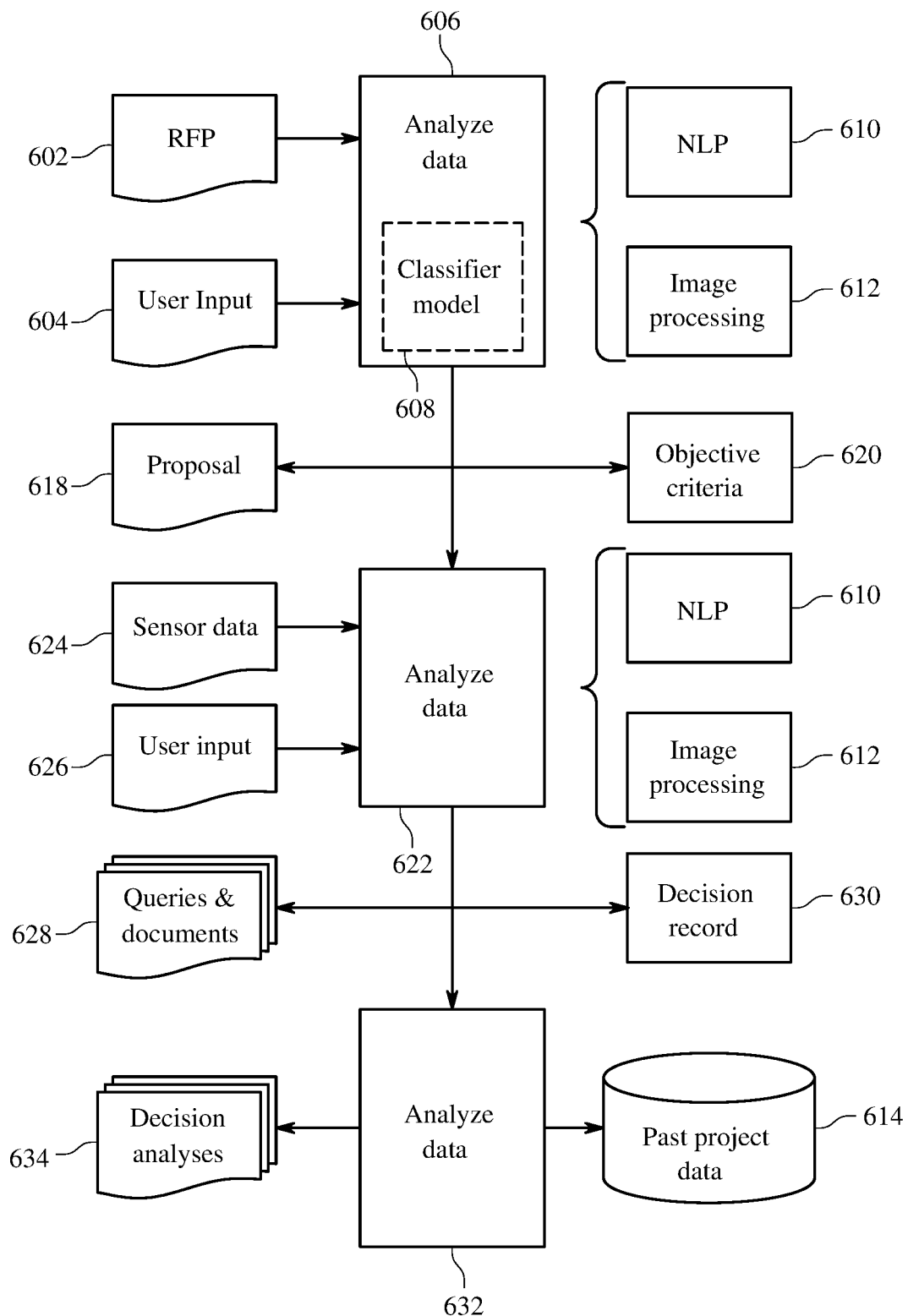
FIG. 6 depicts operative features of a project collaboration system according to an embodiment of the present invention.

FIG. 6 depicts operative features of system 96 according to an embodiment of the present invention. The system receives RFP data 602 and/or user input 604, which the system analyzes at 606. For example, the RFP and/or user input can include documents, blueprints, written specifications and the like. The system analyzes the data and input using natural language processing (NLP) 610 and/or image processing 612. Using a classifier model 608, constructed with machine learning as described above, the system classifies the project as similar to one or more past projects and extracts corresponding data from a database of past project data 614. Within past project data, decisions made in each respective project may be annotated. For example, decisions may be annotated by system automatically or manually by users as major decisions or trivial decision.

Based on the data analysis, the system generates a response proposal 618 to the RFP and a set of objective criteria 620. Objective criteria can be predefined in terms of factors, such as time to completion, project performance, cost and profitability. The system can identify as major decisions those decisions that, based on analysis of past project data or user input, are likely to affect the project's outcome. The system, for example, is capable of detecting decisions in the current project and determining whether such decisions are major or trivial based on a comparison of the annotated decisions in past project data 614. Users may also flag decisions not identified by the system as major decisions. Thus, a major decision is one that makes it more or less probable that the project will satisfy the objective criteria. That is, for example, whether the project is completed on time, within budget, and meets all performance metrics depending on the nature of the project. The system tracks decision making throughout the project.

During project implementation, the system preforms multiple analyses at 622 of various sensor data 624 and/or user input 626. Sensor data 624, as described above, can include images of specifications, blueprints, software code, or other such data, other images and/or video, as well as audio data related to project implementation. The system analyzes such data using natural language processing (NLP) 610 and/or image processing 612 as the case may be. As also described above, the data is analyzed in the context of various implementation decisions.

Some implementation decisions require one or more approvals from team members and others (e.g., managers, executives, and counsel). Based on the analyses at 606 and 622, the system anticipates implementation decisions that are likely and, in response, generates related documents (e.g., specifications, spreadsheets, blueprints, or customer requirements) and queries 628 that may be used as part of the decision process and stored as part of the decision-making record 630 for subsequent analyses. One set of queries and related documents is generated when the system identifies a non-conforming decision. The queries may request an explanation and submission of documents used to support a detected non-conforming decision. The user response to queries and documents are made part of the record 630 of the project for subsequent analysis.

The system is also capable of generating a notification in response to detecting a non-conforming decision made during project implementation. The system identifies team members whose scope of work on the project is affected by the change in implementation resulting from the non-conforming decision.

At 632, the system is capable of analyzing the decision record, from the initial response to the RFP to the final implementation decision. The system can identify which objectives were met (e.g., completed on time, within budget, and specified performance metrics by project) and which were not. The system can link each decision to one or more of the objective criteria. The system assesses each decision and determines whether the decision contributed to the project meeting, failing to meet, or exceeding predefined criteria for success. For example, depending on the specified criteria the system determines whether the system caused or contributed to the project's being completed timely, being completed within budget, and meeting all performance metrics, The system also determines whether the decision was non-conforming in that the decision deviated from an earlier agreed upon specification or a similar past decision on a similar past project. The analysis can be a decision-by-decision analysis 634 and becomes part of the project record (e.g., part of a blockchain). The project data is added to the corpus of training data and used to update and refine the system's classifier model 608.

Figure 7A:
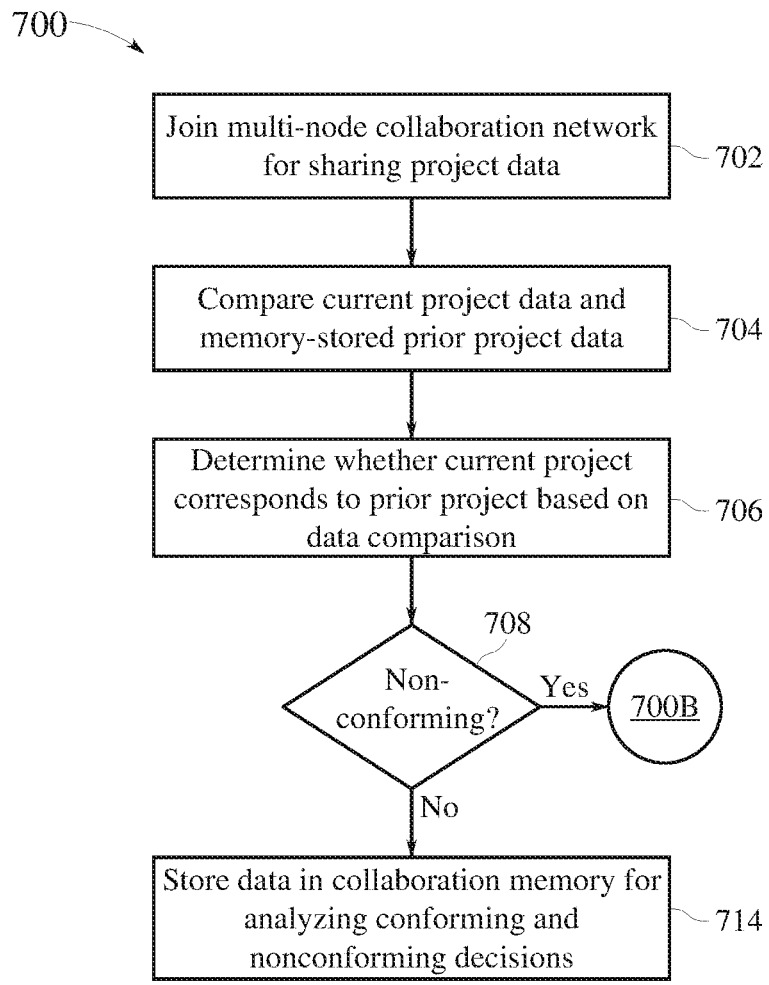
FIGS. 7A and 7B provide a flowchart of a method of project collaboration according to an embodiment of the present invention.
Figure 7B:
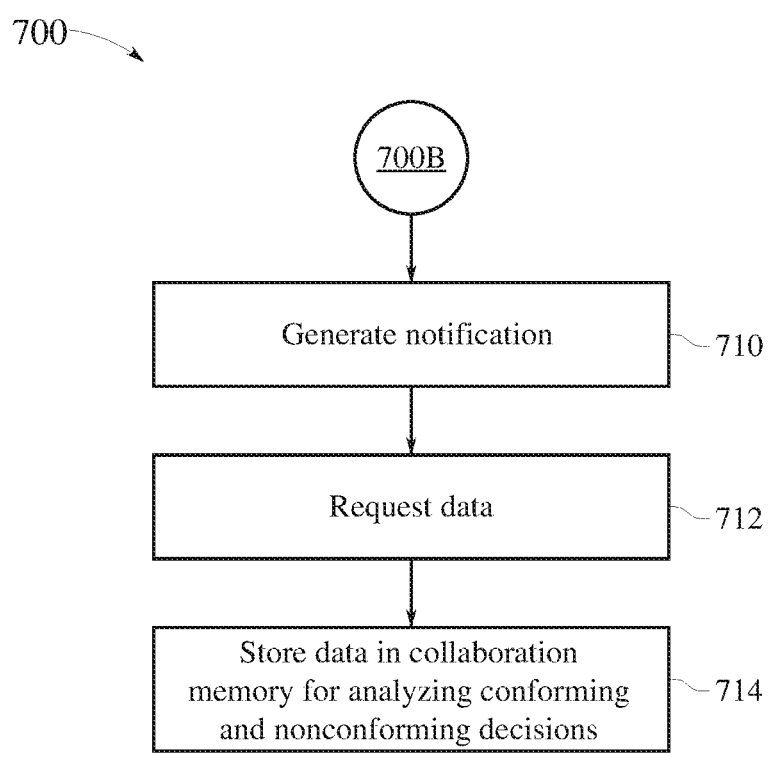

FIGS. 7A and 7B provide a flowchart of a method 700 for consensus-based project collaboration according to one embodiment. Method 700 can be performed by a system the same or similar to the system described in connection with FIGS. 1-6. Method 700 can begin with the assembly of a team tasked with completing a particular project. At 702, a computing node joins a collaboration network comprising multiple computing nodes with which the team members share project data. At 704, the system is capable of comparing shared project data with previous project data stored in a collaboration memory of a server communicatively coupled to one or more of the computing nodes of the collaboration network. At 706, the system determines, based on the comparison, whether the current project corresponds to a prior project. If at 708 the system detects a nonconforming decision made by a project team member, the system is capable of generating a notification at 710. The system can direct the notification to a responsible team member device. The notification may request that decision-justification data be saved in the collaboration memory at 712. At 714, data exchanged by team members with the multiple computing nodes is stored in the collaboration memory in a format for analyzing conforming and nonconforming decisions related to the project.

Optionally, the method can include identifying a set of decision requirements based on comparing current project data with previous project data. A decision requirement is any decision that must be made at some point during completion of the project. If the current project is determined to correspond to a prior project, decision requirements of the prior project can be used to anticipate current decisions that must be made to bring the project to fruition. Otherwise, newly determined decision requirements will be established and saved for future reference along with other data related to the current project.

The system can create a classification model using machine learning (e.g., linear discriminant analysis, naive Bayes classification, support vector machines) to classify projects based on user-selected features. The model can be used to categorize projects and to identify features and aspects of past projects that, according to user specifications, warrant consideration and comparison to aspects and features of the current project.

Method 700 also can include monitoring one or more implementation tasks with a sensing device communicatively coupled to the collaboration network. The sensing device can be trained (e.g., using machine learning such as visual deep learning) to identify and capture images of items or activities performed in connection with the project. The images can be conveyed via the collaboration network to one or more computing nodes. An image can reveal that performance deviates from an approved project decision. An image can also reveal a nonconforming decision based on comparison with a previous project image, where the current project has been determined to correspond to the previous project from which the image is derived.

Figure 8:
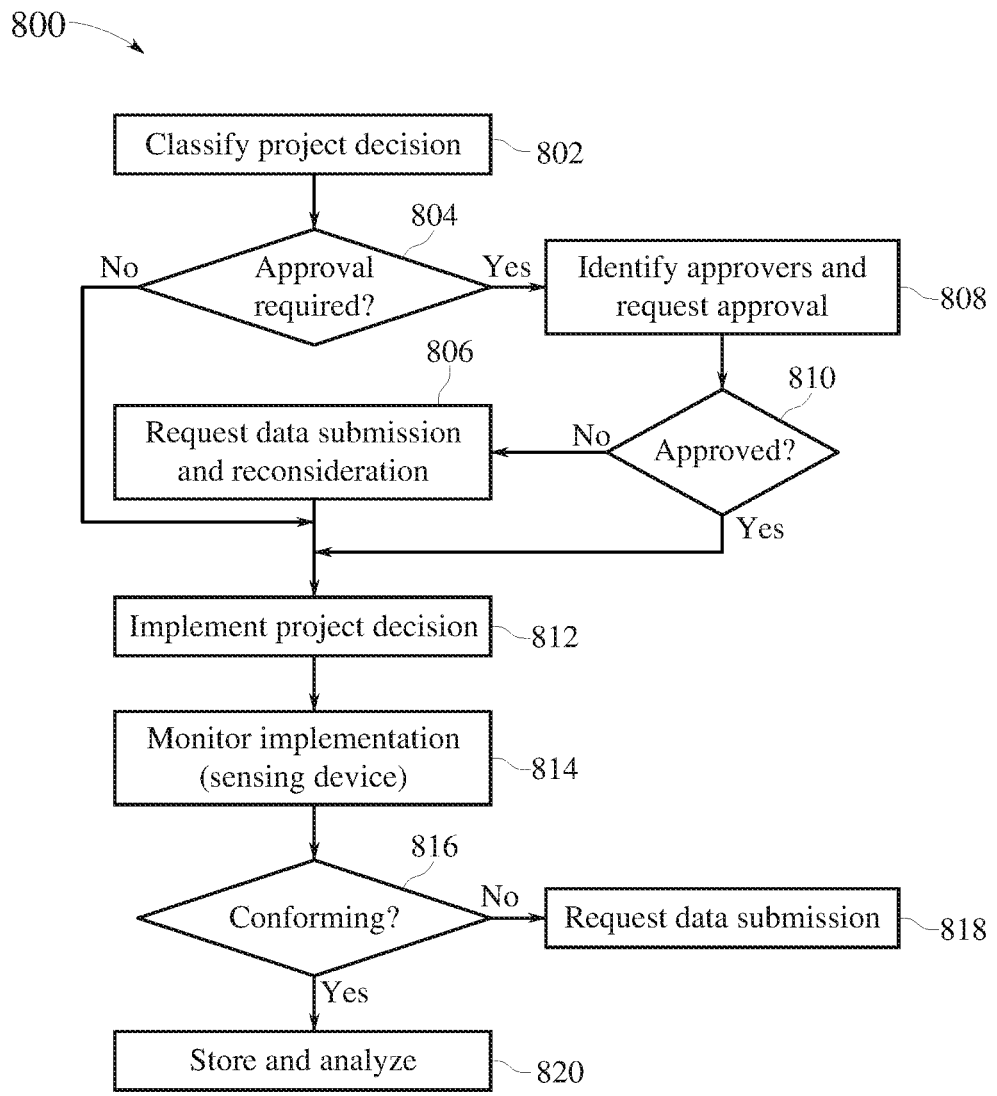
FIG. 8 provides a flowchart of a method of project collaboration according to another embodiment of the present invention.

Consensus-based project collaboration, according to another embodiment, is exemplified by method 800 illustrated by the flowchart in FIG. 8. Method 800 can be performed by a system the same or similar to the system described in connection with FIGS. 1-6. Method 800 includes classifying a project decision at 802 based on data entered at one or more computing nodes forming a collaboration network that includes a collaboration server for storing current and past project data. The decision is classified according to whether the decision is one requiring the approval of one or more designated team members. If at 804 the system determines that approval is not required, the decision is implemented at 812. If, however, the system determines that approval is required, the system at 808 identifies the team member or members responsible for providing the approval and generates a request for approval from each member identified. The system delivers the request to devices of each identified team member. Each team member who approves the decision can be designated as an approver whose identity is recorded by the system along with the approver's reason for approval in response.

If approval is not given at 810, then at 806, the system requests data be supplied by the team member seeking approval, along with a reconsideration invitation. Project implementation can proceed at 812 without an approval, but as with nonconforming decisions, non-approved decisions are made part of the permanent record for future analysis as to whether, with hindsight, the decision proved correct or not.

Likewise, using one or more sensing devices, project implementation can be monitored at 814. If at 816 the system determines that one or more aspects of implementation deviates from a prior decision as to how implementation was to proceed, then, again, at 718 the system generates a request for data submission to one or more team members. The data can be stored for future analysis. At 820, conforming and nonconforming decisions are analyzed by the system, as described in more detail above.

Analyzing both conforming and nonconforming decisions can include determining whether each of a plurality of decision requirements have been met. Analyzing conforming and nonconforming decisions according to method can include additionally, or alternatively, classifying each of the decisions as a success or failure according to a user-specified criteria of success.

Figure 9:
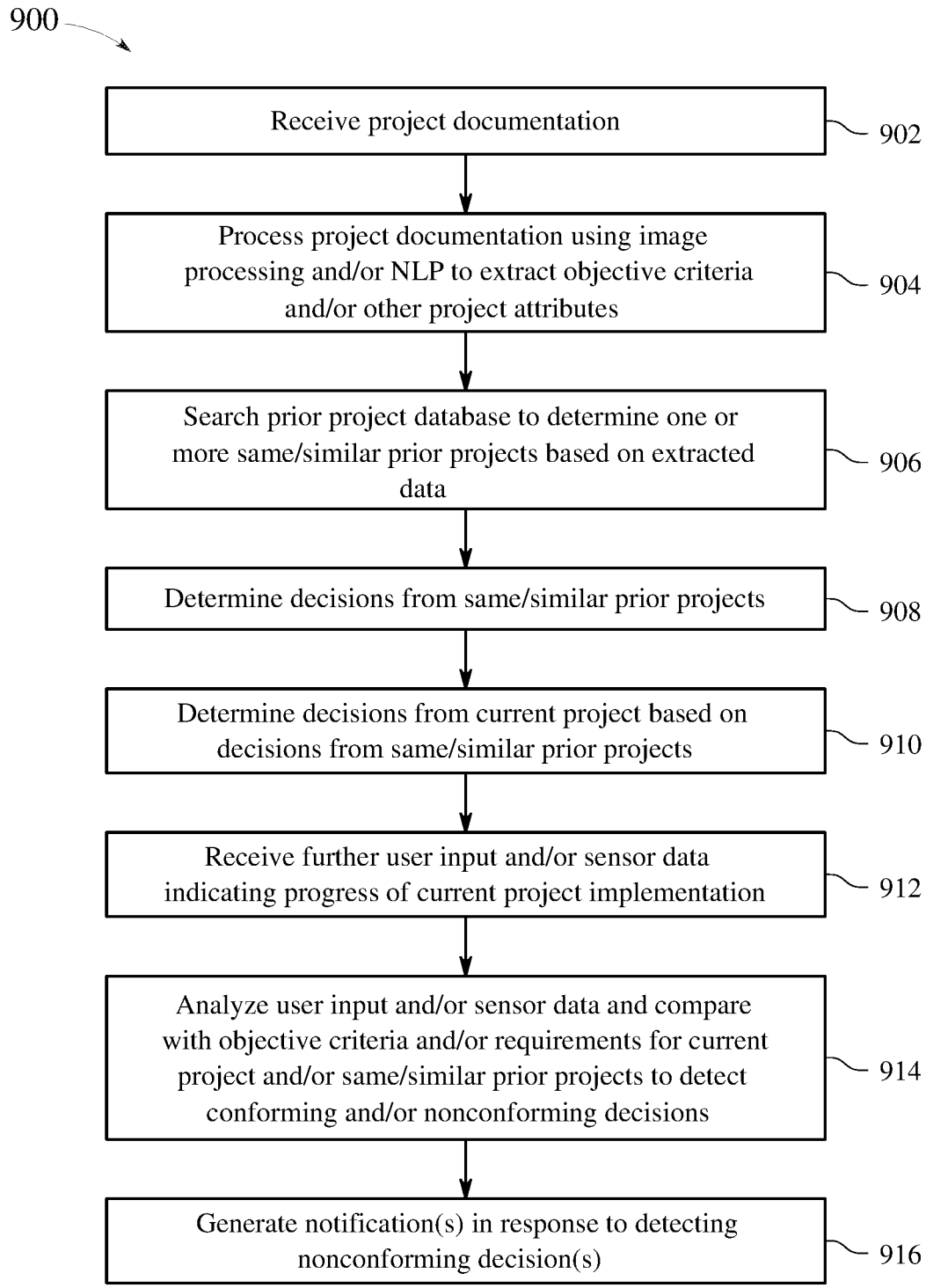
FIG. 9 provides a flow chart of a method of project collaboration according to another embodiment of the present invention.

FIG. 9 provides a flow chart of a method 900 of project collaboration according to another embodiment of the present invention. Method 900 may be implemented by a system as described herein in connection with FIGS. 1-6.

At 902, the system is capable of receiving project documentation. For example, the system is capable of receiving one or more documents such as an RFP, a proposal, and/or image data defining the scope of the project to be implemented. The system may receive documentation via sensors, e.g., a scan or image and/or as an electronic document.

At 904, the system is capable of processing the project documentation using image processing and/or NLP to extract objective criteria and/or other project attributes. For example, the system is capable of extracting project attributes such as requirements as determined from the project documentation. The image processing and/or NLP may be trained to detect requirements, part numbers, and other information from the RFP, proposal, and/or other documentation.

At 906, the system is capable of searching a prior project database to determine one or more same and/or similar prior projects based on the data extracted in block 904. As discussed, and one or more embodiments, the system is capable of processing the data extracted from the project documentation through a classifier model and using the result to search and/or index into a database of prior projects. The database of prior projects may also have been classified using the classifier for purposes of searching and/or matching the current project to one or more prior projects (e.g., by matching classifications, matching the attributes such as project requirements, and the like).

At 908, the system is capable of determining one or more decisions from the same and/or similar projects determined in block 906. Decisions made for the same enter similar projects may be annotated within the database. As discussed, the annotations may be created automatically using a trained classifier, manually, or a combination of both. Taking an IT project to create a computing system as an example, decisions may relate to aspects of the project such as the architecture of the computing system, types of physical servers to be used, operating system and/or application software to be executed by the servers, network architecture, and the like. Each of these items in the same and/or similar projects may be annotated as decisions. Further, as discussed, decisions may be annotated as major or trivial.

At 910, the system is capable of determining decisions for the current project based on decisions from the same and/or similar prior projects. In one or more embodiments, the system is capable of processing the extracted data through a classification model trained to detect decisions based on the annotated decisions in the prior projects. It should be appreciated that user input may also be received that tags or otherwise annotates decisions in the current project.

At block 912, the system is capable of receiving further user input and/or sensor data indicating progress of the current project implementation. For example, the system is capable of receiving images and/or audio as sensor data and/or other documentation such as test results and the like.

At block 914, the system is capable of analyzing the user input and/or sensor data. The system is capable of comparing attributes of the receive data with objective criteria and/or requirements for the current project to detect conforming and/or nonconforming decisions. The system is also capable of comparing the received data with the same or similar prior projects to detect conforming and/or nonconforming decisions. For example, the system is capable of processing the data received in block 912 using image processing and/or NLP to extract various attributes. The system is capable of correlating (e.g., comparing) the extracted attributes with the objective criteria, the project requirements, and/or decisions of the current project and/or comparing the attributes with decisions made in the same and/or similar prior projects. As an illustrative and nonlimiting example, the system is capable of detecting a particular type of part being used in the current project the image processing and/or NLP from the receive data. The part may be a type of server, type of operating system, or type of database, for example. The system is capable of comparing the extracted attributes with the project requirements and/or identified decisions.

At 916, the system is capable of generating one or more notifications in response to detecting nonconforming decisions. As discussed, the system is capable of sending the notifications to one or more team members. Further, the system is capable of implementing any of the various other operations described herein in connection with documenting the nonconforming decision and/or attempting to obtain consensus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments discloses. Many modifications and variations will be apparent to those of ordinary skill in the art without departing from the scope and spirit of the described embodiments. The terminology used herein was chosen to best explain the principles of the embodiments, the practical application or technical improvement over the technologies found in the marketplace, or to enable others of ordinary skill in the art to understand the embodiments disclosed herein.

That which is claimed is:

1. A method for tracking decision making in a current IT delivery project, comprising:
   joining, using computer hardware, a computing node to a multi-node collaboration network for sharing data corresponding to the current IT delivery project among a set of project team members;
   comparing, using the computer hardware, current project data with previous project data stored in a data storage device communicatively coupled to the collaboration network;
   determining, using the computer hardware, a previous IT delivery project corresponding to the current IT delivery project based on the comparing the current project data with the previous project data;
   providing, using the computer hardware and responsive to detecting a nonconforming design decision associated with the current IT delivery project, an electronic notification of the nonconforming design decision; and
   recording the nonconforming design decision in a blockchain associated with the current IT delivery project,
   wherein the detecting the nonconforming design decision includes determining that a decision in the current IT delivery project deviates from an agreed upon decision in the previous IT delivery project.

2. The method of claim 1, further comprising
   identifying a set of decision requirements based on comparing current project data with previous project data.

3. The method of claim 1, further comprising
   monitoring at least one project implementation task with a sensing device communicatively coupled to the collaboration network.

4. The method of claim 3, further comprising
   detecting the nonconforming design decision based on an analysis of sensor data generated by the sensing device.

5. The method of claim 1, further comprising
   identifying decision data entered at one of a plurality of computing nodes as corresponding to a project decision requiring an approval of least one designated team member and,
   recording, responsive to at least one team member approving the project decision, an identity indicator corresponding to the at least one approving team member and a justification indicator provided by the at least one approving team member.

6. The method of claim 1, wherein
   the detecting the nonconforming design decision comprises determining whether each of a plurality of determined decision requirements has been met.

7. A system, comprising:
   a collaboration server having at least one processor programmed to initiate executable operations, the executable operations including:
   joining a computing node to a multi-node collaboration network for sharing data corresponding to the current IT delivery project among a set of project team members;
   comparing current project data with previous project data stored in a data storage device communicatively coupled to the collaboration network;
   determining a previous IT delivery project corresponding to the current IT delivery project based on the comparing the current project data with the previous project data; and
   providing, responsive to detecting a nonconforming design decision, an electronic notification of the nonconforming design decision associated with the current IT delivery project; and
   recording the nonconforming design decision in a blockchain associated with the current IT delivery project,
   wherein the detecting the nonconforming design decision includes determining that a decision in the current IT delivery project deviates from an agreed upon decision in the previous IT delivery project.

8. The system of claim 7, wherein
the executable operations further include identifying a set of decision requirements based on comparing current project data with previous project data.

9. The system of claim 7, wherein
the executable operations further include monitoring at least one project implementation task with a sensing device communicatively coupled to the collaboration network.

10. The system of claim 9, wherein
the executable operations further comprise detecting the nonconforming design decision based on an analysis of sensor data generated by the sensing device.

11. The system of claim 7, wherein the executable operations further include
identifying decision data entered at one of a plurality of computing nodes as corresponding to a project decision requiring an approval of least one designated team member and,
recording, responsive to at least one team member approving the project decision, an identity indicator corresponding to the at least one approving team member and a justification indicator provided by the at least one approving team member.

12. A computer program product, comprising:
a computer-readable storage medium having program code stored thereon, the program code executable by computer hardware to initiate operations including:
joining a computing node to a multi-node collaboration network for sharing data corresponding to the current IT delivery project among a set of project team members;
comparing current project data with previous project data stored in a data storage device communicatively coupled to the collaboration network;
determining a previous IT delivery project corresponding to the current IT delivery project based on the comparing the current project data with the previous project data; and
providing, responsive to detecting a nonconforming design decision, an electronic notification of the nonconforming design decision associated with the current IT delivery project; and
recording the nonconforming design decision in a blockchain associated with the current IT delivery project,
wherein the detecting the nonconforming design decision includes determining that a decision in the current IT delivery project deviates from an agreed upon decision in the previous IT delivery project.

13. The computer program product of claim 12, wherein
the operations further include identifying a set of decision requirements based on comparing current project data with previous project data.

14. The computer program product of claim 12, wherein
the operations further include monitoring at least one project implementation task with a sensing device communicatively coupled to the collaboration network.

15. The computer program product of claim 14, wherein
the operations further include detecting the nonconforming design decision based on an analysis of sensor data generated by the sensing device.

16. The computer program product of claim 12, wherein the operations further include
identifying decision data entered at one of a plurality of computing nodes as corresponding to a project decision requiring an approval of least one designated team member and,
recording, responsive to at least one team member approving the project decision, an identity indicator corresponding to the at least one approving team member and a justification indicator provided by the at least one approving team member.

17. The computer program product of claim 12, wherein
the detecting the nonconforming design decision comprises determining whether each of a plurality of determined decision requirements has been met.

* * * * *